G. E. WHITNEY.
PRESS.
APPLICATION FILED APR. 19, 1916.
1,302,745.
Patented May 6, 1919.
4 SHEETS—SHEET 1.
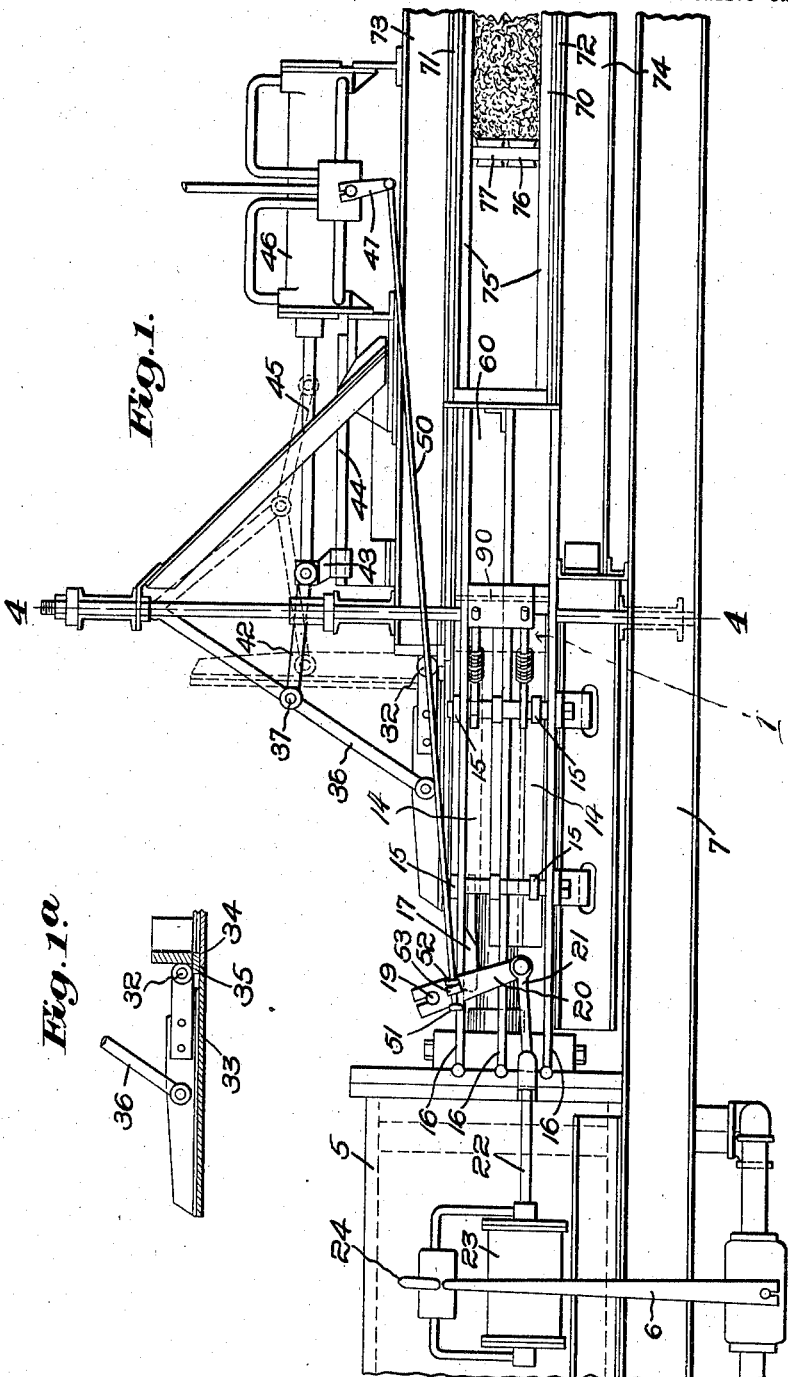

G. E. WHITNEY.
PRESS.
APPLICATION FILED APR. 19, 1916.
1,302,745.
Patented May 6, 1919.
4 SHEETS—SHEET 2.
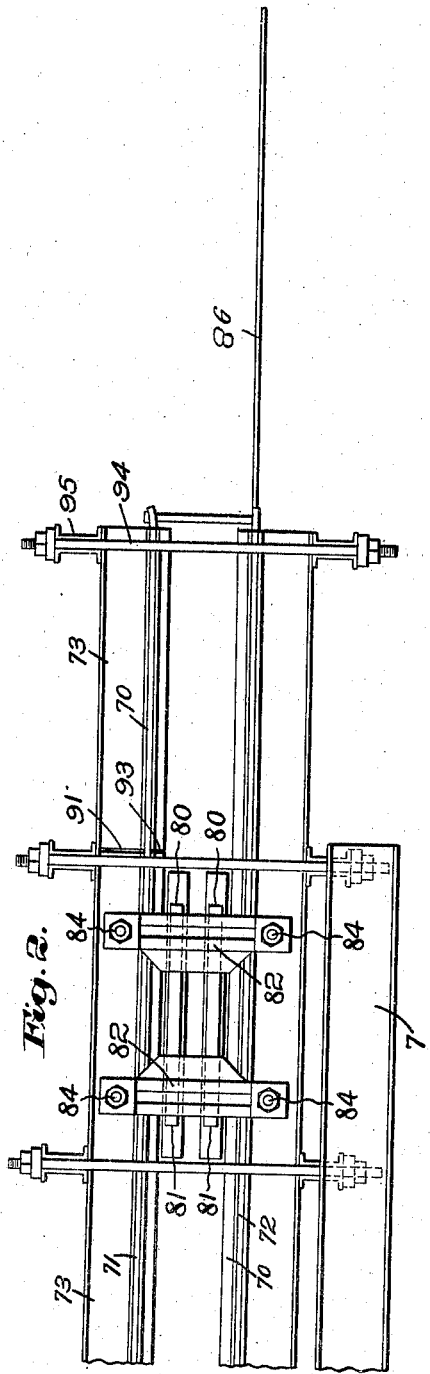
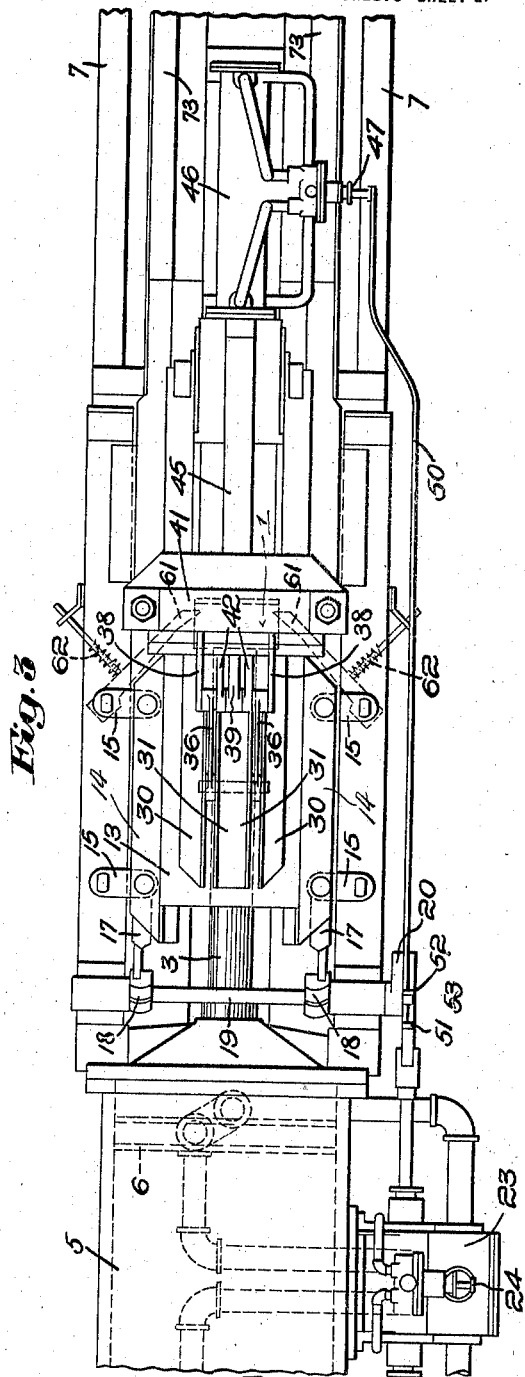
Inventor:
George E. Whitney,
by Emery Booth, Janney & Varney
Attys

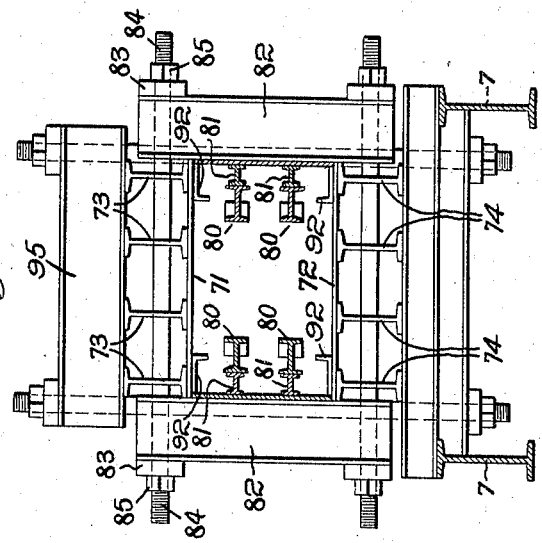

G. E. WHITNEY.
PRESS.
APPLICATION FILED APR. 19, 1916.

1,302,745.

Patented May 6, 1919.
4 SHEETS—SHEET 4.

Inventor:
George E. Whitney,
by Emery Booth Janney Varney
Attys.

UNITED STATES PATENT OFFICE.

GEORGE E. WHITNEY, OF BRIDGEPORT, CONNECTICUT, ASSIGNOR TO UNITED STATES COMPRESSING CORPORATION, OF NEW YORK, N. Y., A CORPORATION OF NEW YORK.

PRESS.

1,302,745.           Specification of Letters Patent.        Patented May 6, 1919.

Application filed April 19, 1916. Serial No. 92,322.

*To all whom it may concern:*

Be it known that I, GEORGE E. WHITNEY, a citizen of the United States, and a resident of Bridgeport, county of Fairfield, State of Connecticut, whose post-office address is 78 Vine street, Bridgeport, Connecticut, have invented an Improvement in Presses, of which the following description, in connection with the accompanying drawings, is a specification, like characters on the drawings representing like parts.

This invention relates to presses, and more particularly, though not exclusively, to presses for forming composite, highly compressed bales of loose material such as hay, excelsior, cotton or the like, which has already been partly compressed and baled.

The invention will be best understood by reference to the following description when taken in connection with the accompanying illustration of one specific embodiment thereof, while its scope will be more particularly pointed out in the appended claims.

In the drawings:

Figure 1 is a side elevation of that portion of the press adjacent one of the hoppers;

Fig. 1ᵃ is a detail of the top door of the hopper;

Fig. 3 is a plan view of the portion of the press shown in Fig. 1;

Fig. 4 is a transverse, sectional elevation taken through the press on the line 4—4 in Fig. 1;

Fig. 5 is a section on the line 5—5 in Fig. 6;

Fig. 7 is a side elevation of the same.

Figure 2:
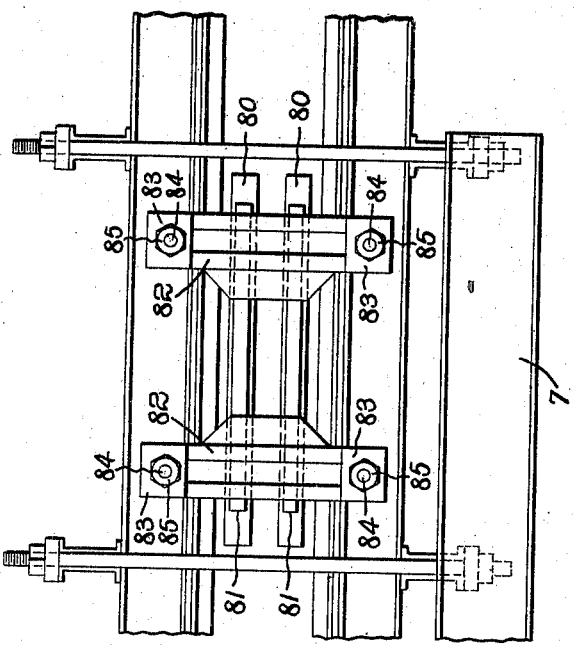
Fig. 2 is a sectional elevation similar to Fig. 1 showing that portion of the machine which extends from the part shown in Fig. 1 to the delivery end.

While the invention may have widely different applications and may be embodied in presses for handling loose hay or other material, in the drawings I have illustrated one form of the invention as applied to a press which is intended to receive bales of hay as formed by the ordinary hay baling machine and to compress the same to a greater density.

In the specific form of press shown, the bales are placed one at a time without removing their bindings in a hopper or materials receiving chamber and are compressed in succession therein by the action of a plunger which forces the last bale against the preceding and already compressed bale. The bales are advanced step by step through the action of the plunger, each bale when fully compressed being held in that condition by spring-pressed dogs. The plunger then retracts, the hopper is opened, another bale inserted, the hopper again closed and the action repeated and the last inserted bale compressed against the previously compressed bale.

Each bale is compressed in the first instance by the plunger to substantially the full degree of compression required for the composite bale. The hopper discharges through a molding chamber into a runway holding a series of bales, which runway is provided with friction surfaces adjustable to retard the passage of the bales therethrough and provide the resistance against which the compression of the bale takes place. The bales are bound together while in transit in the runway in sets of two or more, while held under compression, spacing blocks being inserted between appropriate bales to admit of the insertion of the bindings.

Referring to the drawings and more particularly to Fig. 1, a compressing plunger 1 is secured to one end of the piston rod 3, the latter having a reciprocatory piston (not shown) working in the pressure fluid cylinder 5. The admission of pressure fluid to one end of the cylinder and to the simultaneous exhaust from the opposite end is controlled by any suitable valve operated by the hand lever 6 (Fig. 1). The press is double ended and the opposite end of the piston rod 3 having another plunger similar to the plungers 1, as a bale is compressed in one side or end, the plunger in the opposite side or end is retracted to permit another bale to be introduced. Each side or end of the press is complete in itself and the two are alike in construction, so that a description and illustration of one end only is necessary.

Referring more particularly to Figs. 1 to 4, inclusive, the machine is mounted upon any suitable supports such as the I-beams 7 suitably anchored together. Next adjacent the cylinder 5 and rigidly secured thereto is a materials receiving chamber or hopper in which the plunger 1 is adapted to reciprocate. This chamber (see Fig. 4) is provided with the fixed bottom plate 10 and side doors 11 and 12 and the top door 13, the doors 11, 12 and 13 being adapted to open to permit the ready insertion of a bale.

The side doors 11 and 12 are similar in construction and a description of one only is necessary. Each side door plate 11 is secured to angle irons 14, the latter being jointed to toggle links 15 which are pivoted upon the longitudinally extending and rigid side bars 16. When the links are swung about their pivots (left-handedly as viewed in Fig. 3), they swing the side doors farther apart, increasing the lateral dimension of the hopper. To swing the doors open one of the links 15 nearest the cylinder is connected to a link 17, which latter is attached to the arm 18 secured to the transverse rocker shaft 19. The latter is turned by means of the depending rocker arm 20 at one end thereof secured by the connecting rod 21 to the piston rod 22, the latter having a reciprocatory piston adapted to be moved within the cylinder 23 by the admission of pressure to one or the other end of the cylinder through the manual control of a valve, the hand lever of which is represented at 24.

When the piston is moved to one end of the cylinder by manipulation of the valve lever 24, the shaft 19 is rocked, the links 17 moved in such direction as to swing the side doors 11 outwardly to open the hopper. When the piston is moved in the opposite direction, the movement of the link 17 is reversed, swinging in the toggles and positively and forcibly moving the doors in to their closed position.

The top door 13 may also be opened and preferably, though not necessarily, this door is also opened by pressure fluid which in the illustrated embodiment of the invention is applied automatically to coördinate with the movement of the side doors. Referring more particularly to Figs. 1, 1ª, 3 and 4, the top door comprises a plate reinforced by the angle irons 30 and the channel iron 31 and hinged at 32 to the frame of the press. The point at which the door is hinged is preferably located at or near the forward or exit end of the hopper or that end near the outlet of the chamber in the direction in which the compressing plunger moves, thereby giving the door and the hopper greatest strength and stiffness at the point where the compression is greatest. Furthermore, should the bale when introduced prevent the complete closure of the top door, the action of the plunger merely forces the bale through the hopper, which gradually becomes more restricted toward the outlet end so that the bale passes out of the hopper fully compressed and of the required shape.

Additional strength is given to the door by the method of hinging. Referring to Figs. 1 and 1ª, it will be seen that the heel 33 when the door is closed, in addition to abutting against the fixed plate 34, swings in under the overlying bed plate 35 rigidly fixed on the frame of the press, which effectually locks it and prevents the compression within the chamber from outwardly displacing the heel of the door.

To open and close the top door, the angle irons 30 and channel iron 31 are jointed to the two links 36, the latter in turn being jointed by the pin 37 to two similar links 38, 38 and an intermediate link 39. The last three links have their upper ends jointed to a transverse pin 40 which is supported on the overhead cross beams 41 sustained on the machine by fixed, upright supports. The two sets of links 36, 36 and 38, 38, 39 constitute toggle links. When moved to the full line position shown in Fig. 1, they effect a forcible closure and locking of the door, or when the joint 37 is retracted to break the toggle, the door swings to the dotted line position therein indicated.

To control the toggle the pin 37 is connected by a pair of connecting links 42, 42, to the cross head 43 mounted to slide on the guide 44 fixedly arranged lengthwise the frame. The cross head 43 may be reciprocated by means of the piston rod 45 connected to a piston (not shown) mounted in the fluid pressure cylinder 46. Pressure fluid may be admitted to either end of the cylinder to move the cross head forcibly in either direction by means of any suitable controlling valve controlled by the valve arm 47.

Preferably means are provided so that the action of the pressure cylinder 46 is coördinated with that of the cylinder 23. While any desired relative automatic movements might be had suited to the uses to which the press is put, herein the arrangement is such that the side doors are caused to close just in advance of the closure of the top door and conversely are caused to open just in advance of the opening of the top door. This operation is designed to facilitate the introduction of the individual bales to be compressed and to increase the speed of operation of the machine.

Any suitable means may be employed for accomplishing this, but herein the valve arm 47 is connected by the link or rod 50 to the side door operating arm 20. Herein the rod carries the lugs 51 and 52 which engage an intermediate lug 53 on the arm 20, lost motion being preferably provided between the lugs so that an interval is allowed to elapse after the beginning of the movement of the side doors before the rod 30 is actuated to move the top door.

The bale is preferably forced from the hopper into a molding chamber 60, the latter wholly closed in by box-shaped sides top and bottom, and of the necessary distance to produce the desired size of compressed bale. With a press of the character shown, two or three of the ordinary bales of hay may be compressed into one bale, the density depending upon the amount of friction to be overcome by the plunger in moving the bales along the runway, hereinafter described, and discharging them from the machine.

To retain each bale as it is compressed and forced into the molding chamber 60, suitable means are provided such as the spring-pressed dogs 61 (Fig. 3). These are pivoted on the bars 16 with their free ends projecting into the path of the bale. As the hay is forced along, in front of the plunger, the dogs yield, permitting the hay to pass, but when it has been forced past the said dogs, they are restored to their original positions by means of springs 62, 62 which rest against the dogs and force them to move in behind the hay and retain it in the baling chamber when the plunger is retracted.

The bales pass from the molding chamber into a track or runway represented generally by 70 and extending for any desired length. This runway consists of upper and lower plates 71 and 72, respectively, secured to the respective I-beams 73 and 74 and having guide plates 75 lapping over the edges of the bales partly to engage the vertical sides thereof, but to leave them exposed for a considerable extent.

While the bales are in the runway, bindings may be placed upon them to bind together two or more of the previously formed individual bales. For that purpose spacing blocks 76 may be inserted between successive bales when the latter are initially placed in the molding chamber. If three individual bales are to be bound into a single, composite bale, a spacing block is introduced after every third bale. The spacing blocks have each face provided with one or more notches 77 (herein three) and when they reach the runway, binding wires may be inserted from the open sides of the press through the notches from one side to the other and fastened in order to bind together the compressed individual bales which are contained between successive spacing blocks. The spacing blocks are of a suitable cross sectional size to pass through the bore of the press and including the more restricted discharge end of the machine, hereinafter described.

The action of the press is to compress the individual bales each against the preceding bale as it is held in the molding chamber, the compression of each one being substantially complete as it is forced into the molding chamber by the plunger and being substantially independent of the compression of the preceding and succeeding bales. The resistance against which the compression takes place is provided by retarding the passage of the bales after leaving the molding chamber, and herein by restricting more or less the discharge passage beyond the point where the binding takes place in the runway.

Figure 6:
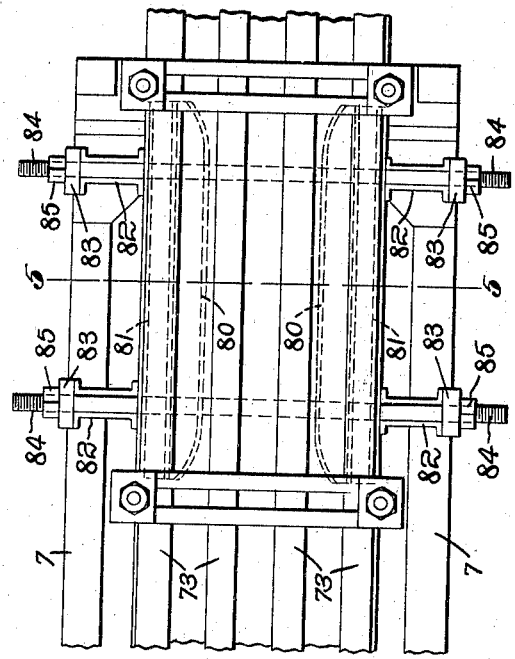
Fig. 6 is a plan view of a portion of the runway.

For this purpose, at any suitable point, as for example, as indicated in Figs. 2, 5 and 6, the runway is provided with friction members 80 (Fig. 5) which engage the sides of the bale and may be adjusted inwardly to retard the advance of the bale by a greater or less amount as required, and thereby control the degree of compression. These friction members may be of any suitable shape, construction and number, but herein they comprise two sets of bars of two each presenting substantially flat faces to the bale and separated by spaces which permit the passage above and below them of the bale bindings which have been previously applied to the bale. This avoids any interference with or disturbance of the bindings. As indicated in Fig. 6, the ends of the friction members preferably have beveled faces so that as the bales are advanced they enter between the beveled ends and are gradually squeezed between them.

To permit of the lateral adjustment of the friction members 80, they are rigidly fastened by interposed I-beams 81, each set to a pair of upright members 82 formed of pairs of channel irons, the latter having fixed thereto the plates 83 through which pass the rods 84 having threaded ends adapted to be engaged by the clamping nuts 85. The rods are four in number and are journaled and supported in the two sets of I-beams 73 and 74. By turning up the clamping nuts on opposite ends of the rods, the friction members may be brought nearer each other and the compressing retardation increased. Conversely, by loosening the nuts, the friction members may be further separated and the retarding friction decreased.

On leaving the friction chamber, the bale continues through the runway and is discharged at any suitable point, as, for example, upon the platform or table 86. The construction of the friction chamber and of the press permits the use of fillers to utilize the press for the compression of bales of different cross sectional dimensions.

For example, if it is desired to compress bales of lesser width, suitable filler plates 87 (Fig. 4) may be inserted in the hopper chamber and similar members in the molding chamber, these members being backed up by members 88 of sufficient thickness to reduce the width of these chambers by the required amount. Fillers of the same thickness are placed in the four corners of the runway so as to engage the sides of the smaller bale. It is only necessary then to adjust the friction members 80 inwardly by an amount sufficient to give the required retardation on a smaller bale. Guidance and alinement are given the plunger 1 in the hopper by means of the guide members 89 which are fixed to the plunger and underlie and slide on the bottom plate 10. The press is shown in the drawings as adjusted for a smaller size bale. When it is required to compress a bale of the full cross section, the fillers 87 and 88 are removed and a plate indicated at 90 in Fig. 1 and of a size substantially equal to the full cross section of the hopper is fixed on the rod of the plunger. Preferably also shorter dogs are substituted for the dogs 61 shown in the drawings.

Frictional retardation may be provided for the bales in the runway either with or without the lateral friction provided by the friction bars 80 by contracting or separating more or less the top and bottom plates 71 and 72 of the runway near the discharge end thereof. For this purpose (see Figs. 2 and 5) the eye beams 73 are shown slightly separated at 91, as are also the angle irons 92 at the point 93, said angle irons being rigidly secured to the top plate 71 and forming the side guides for the bales while in the trackway. The discharge end of the trackway is provided with a pair of vertical tie rods 94 which are secured at the bottom to the base of the machine and at the top to the cross member 95, the latter overlying the eye beam 73. These tie rods are provided with threaded ends and adjusting nuts so that they may be adjusted to contract the discharge end of the trackway by depressing more or less the top plate 71. The latter under such contraction flexes or bends like a hinge, the angle irons and eye beams being separated as described to permit this hinging action.

While I have herein shown and described for purposes of illustration one specific embodiment of the invention, it is to be understood that the same is for illustration only and that the constructional details and relative arrangement of parts may be varied within wide limits without departing from the spirit of the invention.

Claims:

1. In a press, the combination with a materials receiving chamber having an exit, a plunger having a compressing movement toward the exit end, and a door in the side of the chamber having a heel toward the exit end underlying a fixed member secured to the chamber.

2. In a press, the combination with a materials receiving chamber having an exit, a plunger having a compressing movement toward the exit end, and a door for said chamber hinged near the exit end, said chamber having secured thereto an overlying fixed part and said door carrying a part adapted to swing when closed under said overlying fixed part.

3. In a press, the combination with a materials receiving chamber having an exit end, a plunger having a movement toward the exit end, a hinged door for a side of the chamber, hinged upon an axis transverse the length of the chamber, toggle links for operating and locking the door, and fluid pressure means to operate said toggle links.

4. In a baling press, the combination with a materials receiving chamber, a plunger, a receiving chamber and a runway, friction retarding devices, and a door in the materials receiving chamber swinging on an axis transverse to the chamber.

5. In a press, the combination with a plunger, a receiving chamber, side doors, fluid pressure means to open the side doors and a swinging door for the top hinged to open toward the plunger.

6. In a press, the combination with a plunger, a receiving chamber, side doors, fluid pressure means for operating the side doors, a door for the top of the chamber, and fluid pressure means for operating the top door.

7. In a press, the combination with a plunger, a receiving chamber, a side door and a top door therefor, and separate fluid pressure means for operating the side and the top doors.

8. In a baling press, the combination with a materials receiving chamber having an exit end, a plunger having a movement toward the exit end, a discharge passage, means for retarding the passage of the bales therethrough, a door through which a bale may be entered into the receiving chamber, and fluid pressure means for operating said door.

9. In a baling press, the combination with a materials receiving chamber having an exit end, a plunger having a movement toward the exit end, a discharge passage, means for retarding the passage of the bales therethrough, a door through which a bale may be entered into the receiving chamber, and toggle means to operate and lock said door.

10. In a baling press, the combination with a materials receiving chamber having an exit end, a plunger having a movement toward the exit end, a discharge passage, means for retarding the passage of the bales therethrough, a door through which a bale may be entered into the receiving chamber, and toggle means to lock the door.

11. In a baling press, the combination with a materials receiving chamber having an exit end, a plunger having a movement toward the exit end, a discharge passage, means for retarding the passage of the bales therethrough, a door through which a bale may be entered into the receiving chamber, and power-actuated means to open and close the door.

12. In a press, the combination with a materials receiving chamber, a plunger, a plurality of side doors, a top door, and means to control the opening of the top and side doors in coördinated time relation.

13. In a press, the combination with a materials receiving chamber, a plunger, a plurality of doors for said receiving chamber, mechanical opening and closing means for said doors, and means to cause the opening or closing of one door to follow the opening or closing of another door.

14. In a press, the combination with a materials receiving chamber, a plurality of doors, separate fluid pressure means for operating said doors, controlling valves for said fluid pressure means, and a connection between the controlling valves to coördinate the operation of said doors.

15. In a press, the combination with a materials receiving chamber, a plunger, a top door, a plurality of side doors, fluid pressure means for operating said door, separate fluid pressure means for operating said side doors, a controlling valve for each of said fluid pressure means, and a connection from one of said controlling valves to the operating mechanism for the other door or doors to coördinate the operation of the two.

16. In a baling press having a plunger and a compressing chamber and a discharge passage for the bales, a plurality of friction retarding members for retarding the passage of the bales therethrough, said members being separated to avoid interference with the bale bindings.

17. In a baling press, the combination with baling means and a discharge passage for the bales, of a plurality of separated, friction-retarding members for engaging the side of a bale during its passage therethrough.

18. In a baling press, the combination with baling means and a discharge passage for the bales, of friction retarding means for retarding the passage of said bales therethrough, the same including a plurality of sets of separated friction retarding members.

19. In a baling press, the combination with baling means and a discharge passage for the bales, of friction retarding means for retarding the passage of said bales therethrough, the same including a plurality of sets of separated friction retarding members, each set being adjustable to vary the retardation.

20. In a baling press, the combination with baling means of a discharge passage for the bales and separated friction retarding members for engaging the side of the bale in said passage, said members being adjustable toward or from the bale to vary the retardation.

21. In a press, the combination with baling means of a friction passage for the bales, and bevel ended friction retarding means projecting into said passage to engage a side of the bale and retard the passage therethrough.

22. In a press, the combination with baling means of a discharge passage for the bales, and a plurality of oppositely arranged friction retarding plates presenting their faces to the sides of the bale and impeding its passage between the same, said plates presenting beveled ends to the oncoming bales.

23. In a press, the combination with baling means of a discharge passage for the bales, and a plurality of oppositely arranged friction retarding plates presenting their faces to the sides of the bale and impeding its passage between the same, said plates presenting beveled ends to the oncoming bales, and means for adjusting said plates toward or away from each other.

24. In a baling press, the combination with a hopper, a plunger, a molding chamber, a discharge passage, and friction members in the discharge passage arranged to engage the sides of the bale between the top and bottom.

25. In a baling press, the combination with a hopper, a plunger, a molding chamber, a discharge passage, and a plurality of separated friction members engaging the wide portions of a side of the bale.

26. In a baling press, the combination with a materials receiving chamber, a molding chamber, a discharge passage or runway for the bales, adjustable friction retarding devices for the discharged bales in said passage, and filling devices for changing the working cross section of said press to adapt it to different sized bales.

27. In a baling press, the combination with a materials receiving chamber, a molding chamber, a discharge passage or runway, means for opposing the passage of the bales through the runway, and means for changing the working cross section of the press to adapt it to different sized bales.

28. In a baling press, the combination with a materials receiving chamber for receiving previously formed bales, means for further compressing said bales, and means for changing the working cross section of the press to adapt it to different sized bales.

29. In a baling press, the combination with a compressing plunger of a hopper, molding chamber and discharge passage convertible to adapt them to different sized bales.

In testimony whereof, I have signed my name to this specification, in the presence of two subscribing witnesses.

GEORGE E. WHITNEY.

Witnesses:
  ROBERT H. KAMMLER,
  THOMAS B. BOOTH.

Copies of this patent may be obtained for five cents each, by addressing the "Commissioner of Patents, Washington, D. C."